(12) United States Patent
Campomanes

(10) Patent No.: US 9,700,986 B2
(45) Date of Patent: Jul. 11, 2017

(54) METHOD OF MACHINING A SHROUD AND GRINDING WHEEL THEREFOR

(71) Applicant: Pratt & Whitney Canada Corp., Longueuil (CA)

(72) Inventor: Marc Campomanes, Longueuil (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 242 days.

(21) Appl. No.: 14/270,891

(22) Filed: May 6, 2014

(65) Prior Publication Data
US 2015/0321309 A1 Nov. 12, 2015

(51) Int. Cl.
| | |
|---|---|
| *B24B 19/26* | (2006.01) |
| *B23P 15/00* | (2006.01) |
| *B24B 19/00* | (2006.01) |
| *B24D 5/02* | (2006.01) |
| *B24D 7/02* | (2006.01) |
| *B24D 7/18* | (2006.01) |
| *F01D 25/24* | (2006.01) |

(52) U.S. Cl.
CPC .............. *B24B 19/26* (2013.01); *B23P 15/00* (2013.01); *B24B 19/009* (2013.01); *B24D 5/02* (2013.01); *B24D 7/02* (2013.01); *B24D 7/18* (2013.01); *F01D 25/246* (2013.01); *F05D 2230/14* (2013.01); *F05D 2230/18* (2013.01); *Y10T 29/49323* (2015.01)

(58) Field of Classification Search
CPC ..... B24B 19/26; B23P 15/00; Y10T 29/49323
See application file for complete search history.

(56) References Cited

U.S. PATENT DOCUMENTS

| | | | |
|---|---|---|---|
| 7,378,611 B2 | 5/2008 | Vau et al. | |
| 2009/0291622 A1 | 11/2009 | Butler et al. | |
| 2013/0294919 A1* | 11/2013 | Elfizy | ................... B24B 19/009 |
| | | | 416/223 R |

FOREIGN PATENT DOCUMENTS

WO  2007096295  8/2007

* cited by examiner

*Primary Examiner* — Moshe Wilensky
(74) *Attorney, Agent, or Firm* — Norton Rose Fulbright Canada

(57) ABSTRACT

A method of machining a turbine shroud segment including inserting an annular flange of a grinding wheel through a first gap defined between the shroud retention elements and into a second gap defined between the shroud platform and an axially extending, radially inwardly facing arcuate inner surface of one of the retention elements. The wheel flange is inserted with its supporting leg and the wheel body remaining out of contact with the shroud segment and with the wheel flange remaining out of contact with the platform. The inner surface is ground through contact with an annular outer grinding surface of the wheel flange. The wheel leg and body remain out of contact with the shroud segment and the wheel flange remains out of contact with the platform during grinding.

18 Claims, 11 Drawing Sheets

METHOD OF MACHINING A SHROUD AND GRINDING WHEEL THEREFOR

TECHNICAL FIELD

The application relates generally to the machining of shroud segments and, more particularly, of turbine shroud segments for gas turbine engines.

BACKGROUND OF THE ART

Turbine shroud segments are often cast or formed through metal injection molding (MIM) in their general form, with the outer surfaces finished by grinding and EDM. Some shroud segments typically include hook-shaped retention members which define an inner surface facing the shroud platform. This inner surface is typically not machined because of being difficult to access, and this may create design limitations and/or increase the necessary tolerances during the initial manufacturing operations, which may increase the cost of manufacturing the shroud segment.

SUMMARY

In one aspect, there is provided a method of machining a turbine shroud segment defining a circumferential portion of an annular shroud, the segment having an arcuate platform and two axially spaced retention elements extending radially outwardly from the platform, the method comprising: inserting an annular wheel flange of a grinding wheel through a first gap defined between the retention elements and into a second gap defined between the platform and an axially extending, radially inwardly facing arcuate inner surface of one of the retention elements, the wheel flange being supported by a leg of the grinding wheel extending radially inwardly from a body of the grinding wheel, the wheel flange being inserted with the leg and body remaining out of contact with the shroud segment and with the wheel flange remaining out of contact with the arcuate platform; grinding the arcuate inner surface of the one of the retention elements through contact with an annular outer grinding surface of the wheel flange while the wheel rotates relative to the shroud segment, the leg and body remaining out of contact with the shroud segment and the wheel flange remaining out of contact with the platform during grinding of the arcuate inner surface.

In another aspect, there is provided a method of producing a turbine shroud segment defining a circumferential portion of an annular shroud, the method comprising: manufacturing the shroud segment to define: an arcuate platform extending along the circumferential portion, and first and second axially spaced apart retention element extending radially outwardly from the platform, the first retention element having a leg extending radially outwardly from the platform and an arcuate flange extending axially from the leg toward the second retention element, the flange being axially spaced apart from the second retention element, the flange having an arcuate flange inner surface spaced apart from and facing the platform; providing a grinding wheel having: a body defining an annular inner body surface, an annular wheel leg extending radially inwardly from the inner body surface along a radial distance greater than a maximum radial dimension of the retention elements as defined from the platform, and an annular wheel flange extending axially from the wheel leg away from the body and having an annular outer grinding surface, a total axial dimension of the wheel leg and wheel flange being smaller than a smallest axial distance between the second retention element and the flange of the first retention element, a radial thickness of the wheel flange being smaller than a radial distance between the flange inner surface of the first retention element and the platform; inserting the wheel flange between the second retention element and the flange of the first retention element and into the space between the flange inner surface of the first retention element and the platform; and grinding the flange inner surface through contact with the outer grinding surface while the wheel rotates relative to the shroud segment.

DESCRIPTION OF THE DRAWINGS

Reference is now made to the accompanying figures in which.

DETAILED DESCRIPTION

Figure 1:
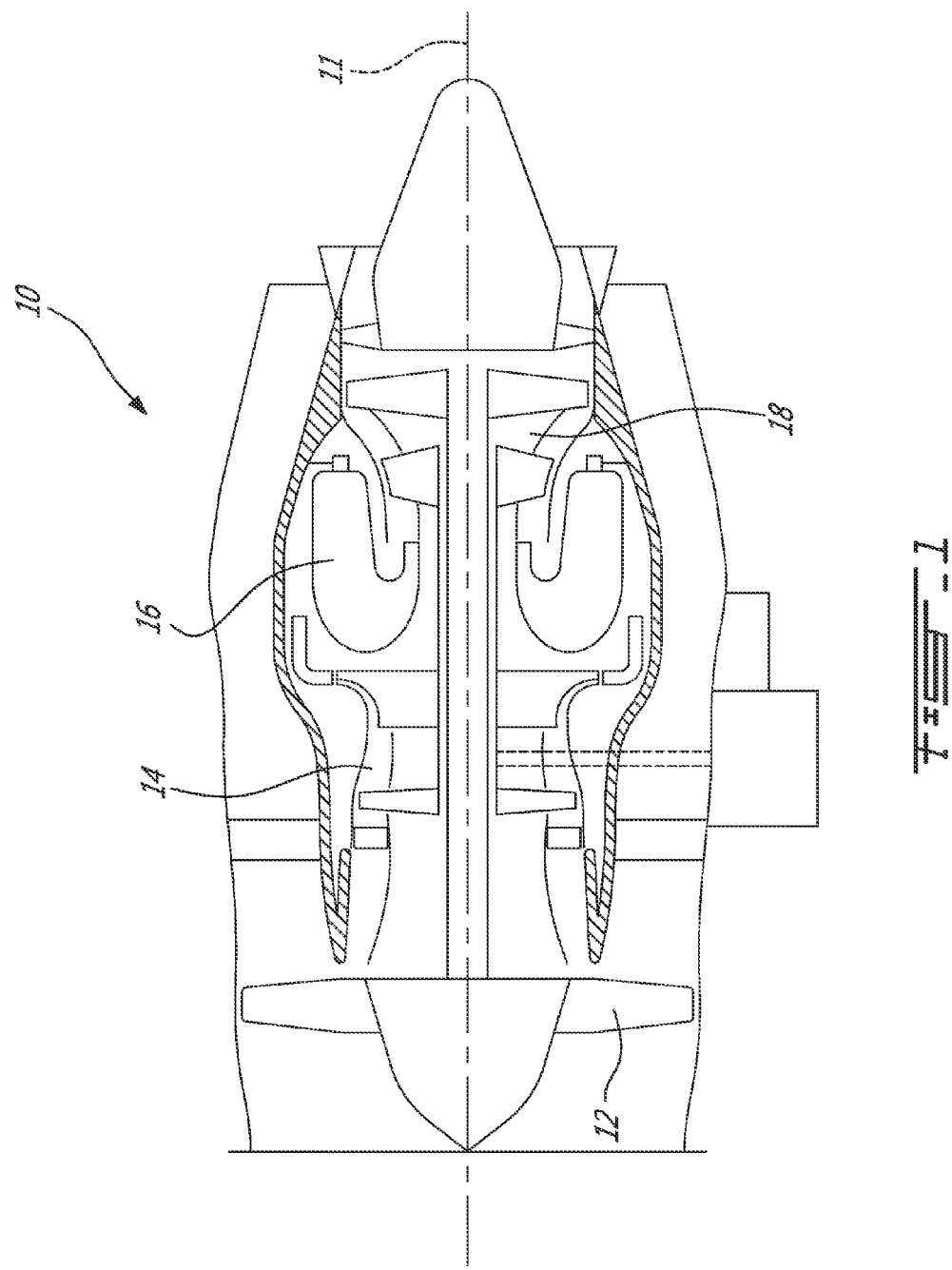
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although the engine 10 is shown as a turbofan, it is understood that the engine 10 may have a different configuration, for example a turboshaft or turboprop configuration.

Figure 2:
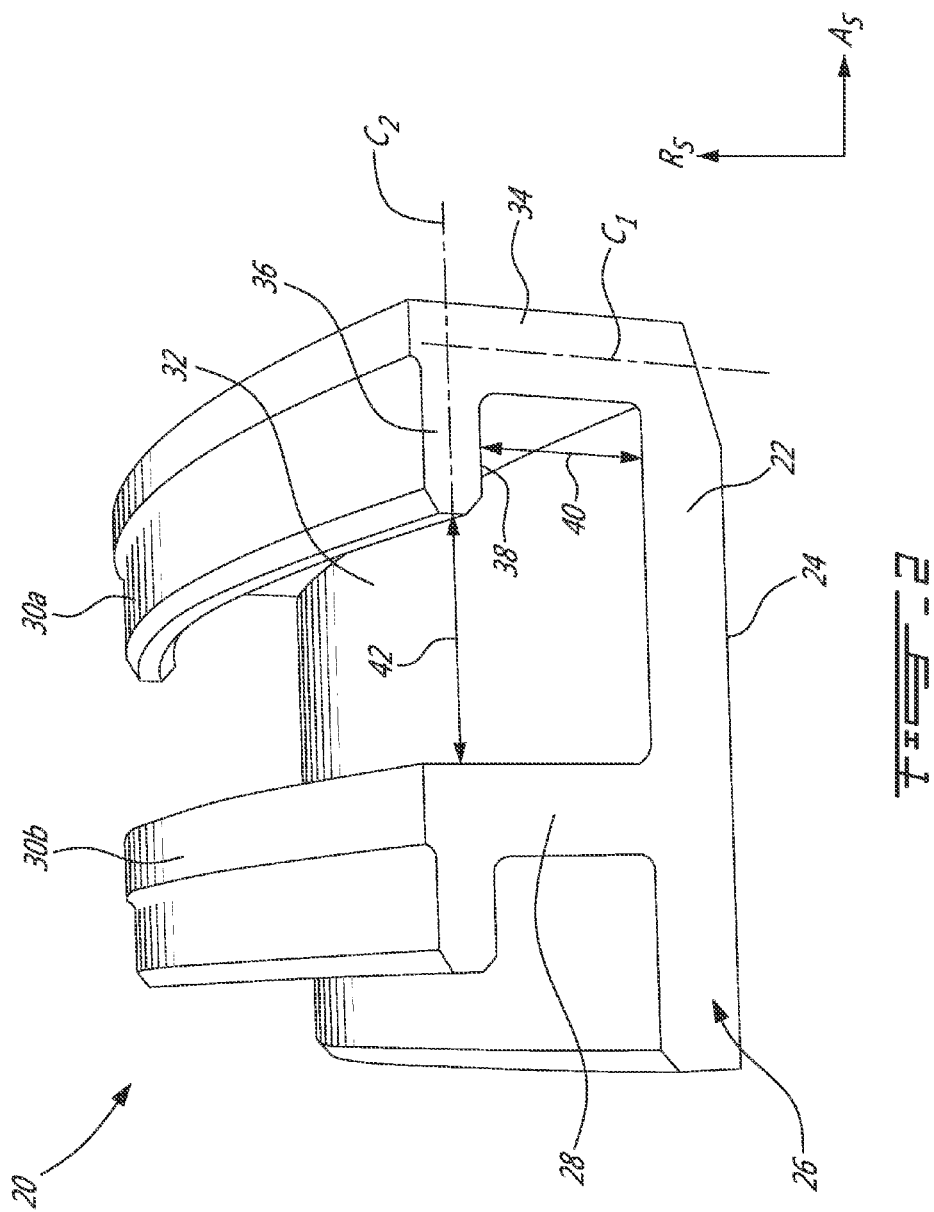
FIG. 2 is a schematic tridimensional view of a shroud segment which may be used in a gas turbine engine such as FIG. 1.

Referring to FIG. 2, a shroud segment 20 is schematically shown, configured for example to form a circumferential portion of an annular shroud surrounding rotating blades of the turbine section 18 in a gas turbine engine 10 such as the one shown in FIG. 1. The body of the shroud segment 20 generally includes an arcuate platform 22 extending between two side surfaces 26 (only one of which being visible in FIG. 2) and defining inner contact surface(s) 24 coming into contact with the hot combustion gases travelling through the turbine section 18. The body of the shroud segment 20 also includes two axially spaced apart retention elements 30a, 30b extending radially outwardly from the platform 22 for engagement with an adjacent structure of the engine 10 to retain the shroud segment 20 in place. Between the retention elements 30a, 30b, the platform defines an outer surface 32 opposed to the contact surfaces 24. In use, the outer surface 32 is exposed to cooling air from an adjacent cavity in fluid communication with the compressor section 14. In a particular embodiment, the platform 22 defines fluid passages (not shown) in fluid communication with the outer surface 32 and allowing the cooling air to penetrate the platform 22 and cool the contact surfaces 24.

In the embodiment shown, the retention elements 30a, 30b are defined as hook structures having an L-shaped cross-section. Each element 30a, 30b has a leg 34 extending radially outwardly from the platform 22, and a flange 36 extending axially from the leg 34. In the embodiment shown in FIG. 2, the cross-section of the leg 34 has a central axis $C_1$ extending parallel to the radial direction $R_S$ of the segment, and the cross-section of the flange 36 has a central axis $C_2$ parallel to the axial direction $A_S$ of the segment; alternate configurations are also possible.

In the embodiment shown, both the leg 34 and flange 36 extend around the entire circumferential dimension of the platform, such that the retention elements 30a, 30b have side surfaces 28 coplanar with the side surfaces 26 of the platform 22. The flange 36 is arcuate and extends concentric with the platform 22. Each flange 36 defines an arcuate flange inner surface 38 which is radially spaced from and faces the platform 22. Accordingly, a gap 40 is defined between each flange inner surface 38 and the platform 22.

The flanges 36 of the two retention elements 30a, 30b extend along the same direction, such that the flange 36 of the first retention element 30a extends toward the second retention element 30b. The flange 36 of the first retention element 30a is however axially spaced from the second retention element 30b, such that a gap 42 is defined therebetween. It can be seen that the flange inner surface 38 of the first retention element 30a is not easily accessible for machining, due to the presence of the second retention element 30b nearby.

In a particular embodiment, the shroud segment 20 is made of a nickel-based super alloy (e.g. MAR-M247®, Inconel® 625, any adequate type of single crystal nickel super alloy). Alternate materials are also possible.

The shroud segment 20 is manufactured with its desired geometry and with dimensions slightly larger than the final desired dimensions, such that the final desired dimensions may be achieved through grinding. In a particular embodiment, the grinding removes a thickness of about 0.015 inches; alternate dimensions are also possible. In a particular embodiment, the shroud segment 20 is manufactured through a metal injection molding (MIM) process. Alternate methods which may be used to form the shroud segment 20 depend on the materials used and may include, but are not limited to, casting, turning, and electric discharge machining (EDM).

Figure 3:
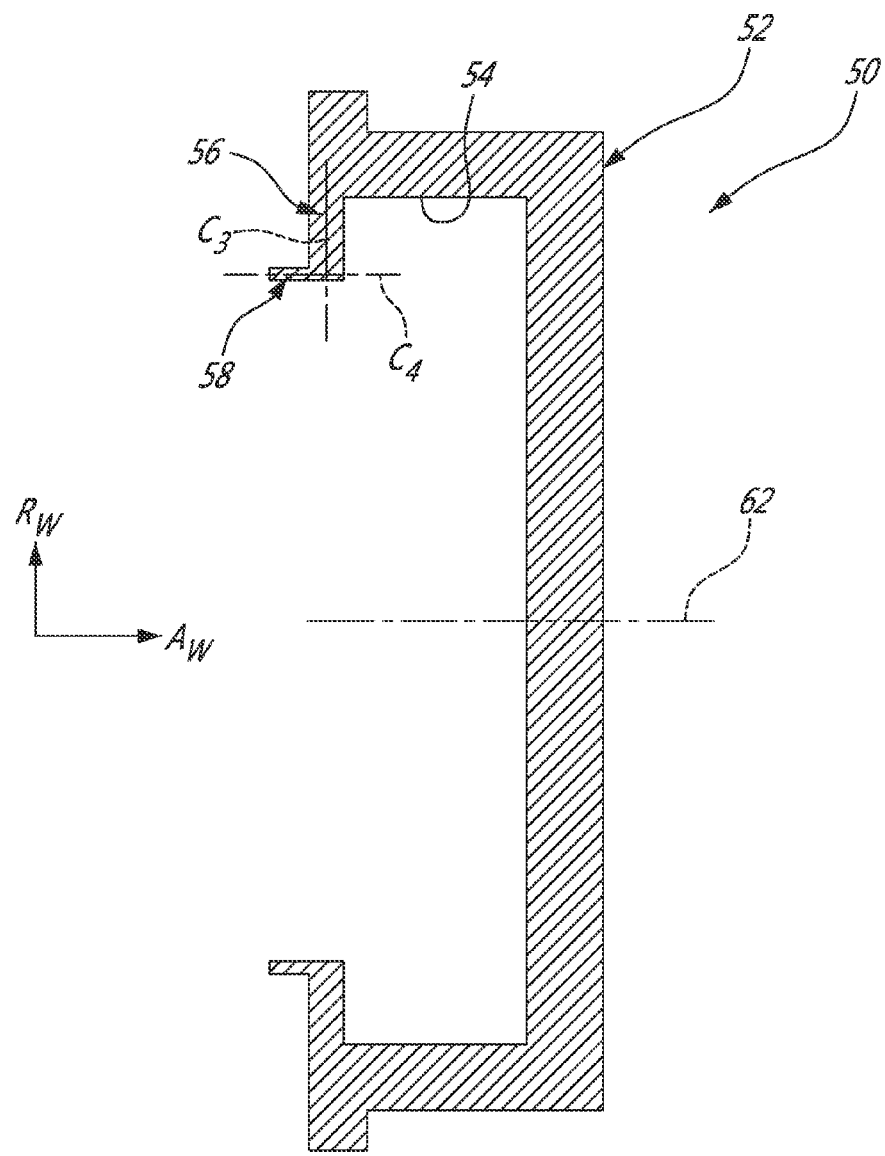
FIG. 3 is a schematic cross-sectional view of a grinding wheel according to a particular embodiment, which may be used to grind a shroud segment such as shown in FIG. 2.

Referring to FIG. 3, a grinding wheel 50 according to a particular embodiment is generally shown. The grinding wheel 50 is configured to be able to access and grind the flange inner surfaces 38 of the shroud segment 20. The wheel 50 thus generally includes a body 52 having an annular inner body surface 54, an annular leg 56 extending radially inwardly from the inner body surface 54, and an annular flange 58 extending axially from the leg 56 away from the body 52. In the embodiment shown, the cross-section of the leg 56 has a central axis $C_3$ parallel to the radial direction $R_W$ of the wheel 50, and the cross-section of the flange 58 has a central axis $C_4$ parallel to the axial direction $A_W$ of the wheel 50; alternate configurations are also possible.

Figure 4:
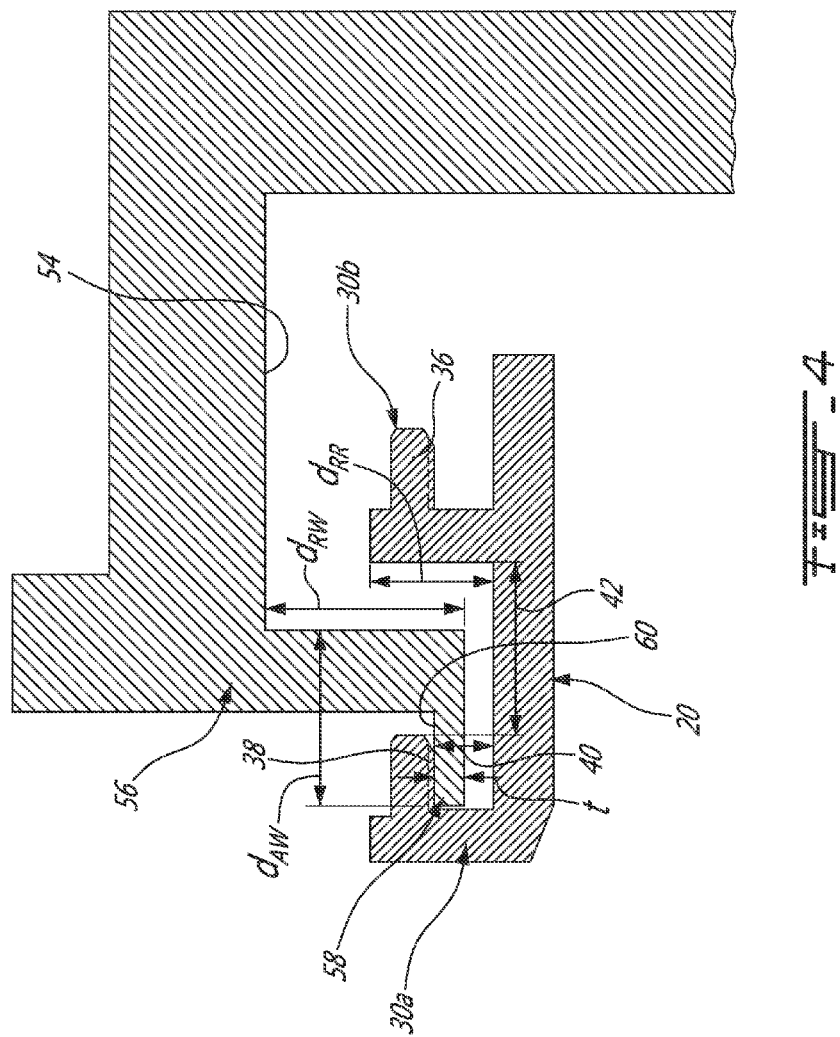
FIG. 4 is a schematic cross-sectional view of the grinding wheel of FIG. 3 grinding an flange inner surface of a shroud segment such as shown in FIG. 2.
Figure 5:
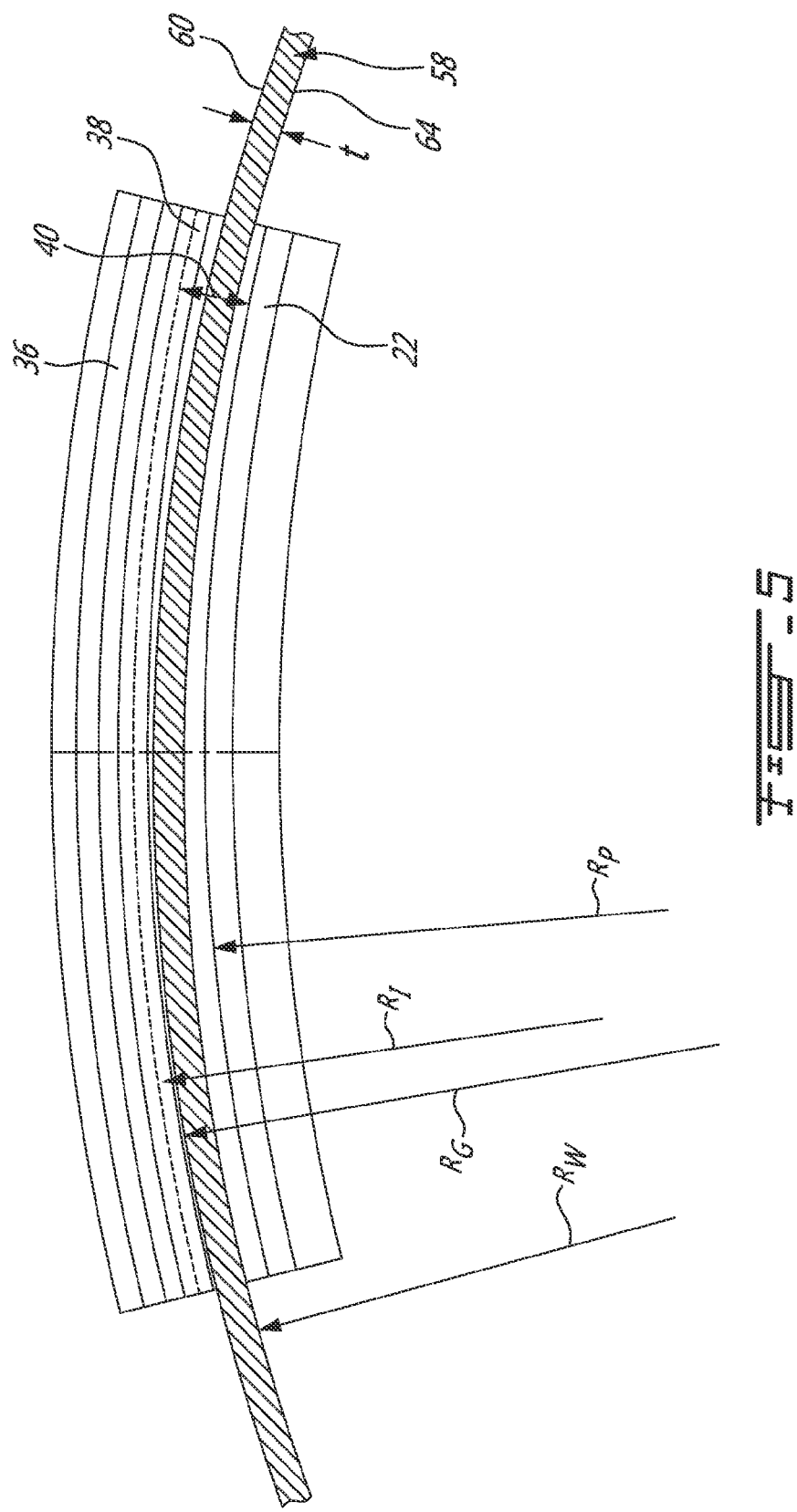
FIG. 5 is a schematic front view of the grinding wheel grinding the flange inner surface.

Referring to FIG. 4, the wheel leg 56 extends from the inner body surface 54 along a radial distance $d_{RW}$ greater than a maximum radial dimension $d_{RR}$ of the retention elements 30a, 30b as defined from the platform 22, such that the wheel leg 56 can penetrate the gap 42 between the retention elements 30a, 30b without contact between the inner body surface 54 and the retention elements 30a, 30b. In a particular embodiment, the difference between the radial distance $d_{RW}$ and the maximum radial dimension $d_{RR}$ of the retention elements 30a, 30b is at least 0.020 inch. A total axial dimension $d_{AW}$ of the wheel leg 56 and wheel flange 58 is smaller than a smallest axial distance between the second retention element 30b and the flange 36 of the first retention element 30a as defined by the gap 42, such that the wheel flange 58 has adequate clearance to be inserted through the gap 42 between the two retention elements 30a, 30b. In a particular embodiment, the difference between the gap 42 and the total axial dimension $d_{AW}$ of the wheel leg 56 and wheel flange 58 is at least 0.020 inch. Referring to FIGS. 4-5, a radial thickness t of the wheel flange 58 is smaller than a radial distance between the flange inner surface 38 of the first retention element 30a and the platform 22 as defined by the gap 40, such that the wheel flange 58 can be inserted between the retention element flange 36 and the platform 22. In a particular embodiment, the thickness t is selected such as to have a clearance of at least 0.010 inch between the wheel flange 58 and the platform 22.

Referring back to FIG. 4, the wheel flange 58 defines an annular outer grinding surface 60 facing away from a central axis 62 (FIG. 3) of the wheel 50. In use, the flange inner surface 38 of the first retention element 30a is ground by inserting the wheel flange 58 between the second retention element 30b and the flange 36 of the first retention element 30a through the gap 42 therebetween, and into the gap 40 between the flange inner surface 38 of the first retention element 30a and the platform 22. The flange inner surface 38 is then ground through contact with the outer grinding surface 60 of the wheel flange 58 while the wheel 50 rotates relative to the shroud segment 20. During the grinding of the flange inner surface 38, the wheel leg 56 and body 52 remain out of contact with the shroud segment 20 and the wheel flange 58 remains out of contact with the platform 22.

The grinding of the flange inner surface 38 of the second retention element 30b is similarly performed by inserting the wheel flange 58 into the gap 40 between the flange inner surface 38 and the platform 22, and grinding the flange inner surface 38 through contact with the outer grinding surface 60 of the wheel flange 58 while the wheel 50 rotates relative to the shroud segment 22. In this case, the flange inner surface 38 is more easily accessible since the gap 40 between the flange inner surface 38 and the platform 22 is open from the axial direction.

Referring to FIG. 5, in a particular embodiment, the radius $R_G$ of the outer grinding surface 60 is slightly smaller that the radius $R_I$ of the flange inner surface 38 to be ground, thus allowing only part of the flange inner surface 38 to contact the outer grinding surface 60 at a time. In a particular embodiment, the radius $R_G$ of the outer grinding surface 60 is about 96% of the radius $R_I$ of the flange inner surface 38. In a particular embodiment, the radius $R_G$ of the outer grinding surface 60 is 98% or less of the radius $R_I$ of the flange inner surface 38 and/or 60% or more of the radius $R_I$ of the flange inner surface 38. The radius $R_W$ of the inner surface 64 of the wheel flange 58, opposite the outer grinding surface 60, is greater than the radius $R_P$ of the platform 22 such as to be able to grind the flange inner surface 38 without contacting the platform 22. In a particular embodiment, the difference between the radius $R_W$ of the inner surface 64 of the wheel flange 58 and the radius $R_P$ of the platform 22 is selected such as to have a clearance of at least 0.010 inch between the wheel flange 58 and the platform 22.

In a particular embodiment, the difference in radii between the contacting surfaces 38, 60 allows for the contact between the grinding wheel 50 and the shroud segment 20 to be minimized, which in a particular embodiment may reduce risks of burn of the wheel 50 and/or shroud segment 20. In a particular embodiment, at most 30% of the flange inner surface 38 is in contact with the outer grinding surface 60 at any time during the grinding of the flange inner surface 38. In a particular embodiment, about 25% of the flange inner surface 38 is in contact with the outer grinding surface 60 at any time during the grinding of the flange inner surface 38. In an alternate embodiment, the contacting surfaces 38, 60 have the same radius such that 100% of the flange inner surface 38 is in contact with the outer grinding surface 60.

The radial thickness t of the wheel flange 58 is minimized to have sufficient clearance to penetrate and grind within the relative small gap 40 between the flange inner surface 38 and the platform 22, while being large enough to avoid overheating of the wheel flange 58, since overheating may damage the shroud flange 36 during grinding. In a particular embodiment, the radial thickness t of the wheel flange 58 is at least 0.050 inches, and preferably at least 0.060 inches; and/or at most 80% of the radial dimension of the gap 40 between the flange inner surface 38 and the platform 22, and preferably at most ⅔ of this radial dimension. In a particular embodiment, the wheel is dimensioned such as to have a minimum clearance of at least 0.010 inch with any surface of the shroud it is not intended to contact during the grinding process.

In a particular embodiment, the grinding wheel 50 is also configured for grinding some, or all, of the other surfaces of the shroud segment 20. The shroud segment 20 may thus be finish ground in same setup with a 3-axis grinding machine supporting the grinding wheel 50.

Figure 6:
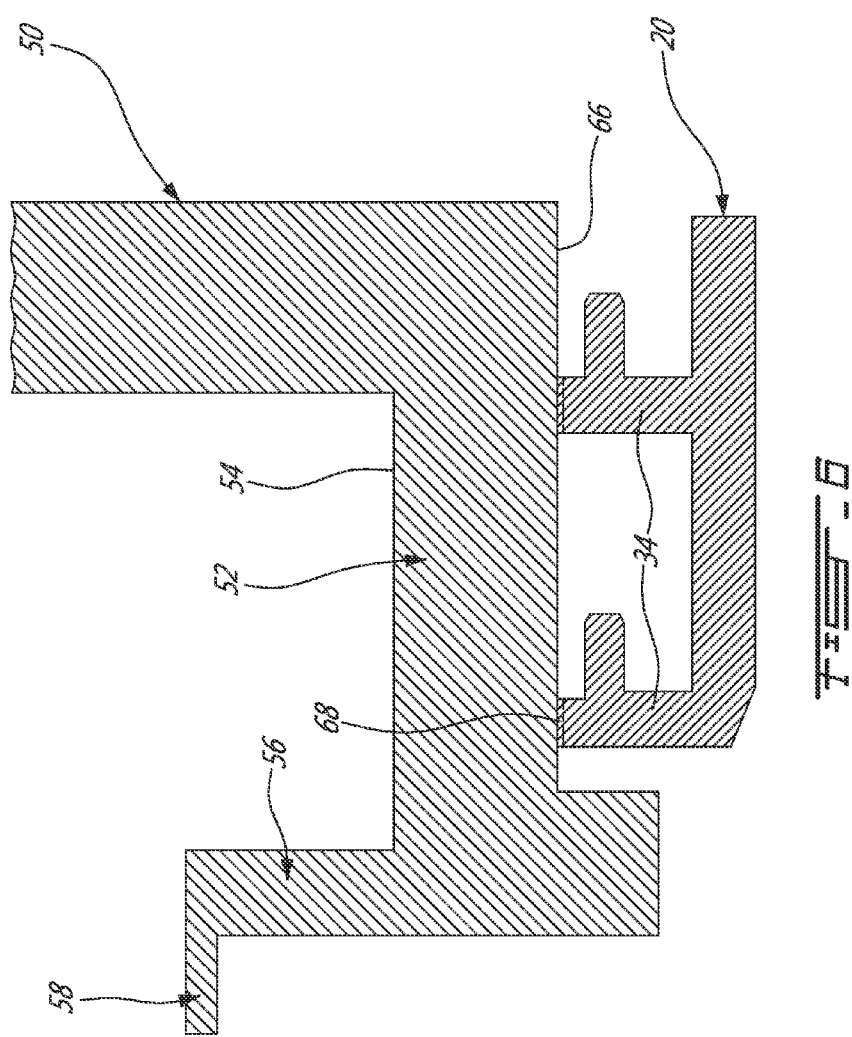
FIG. 6 is a schematic cross-sectional view of the grinding wheel grinding leg outer surfaces of the shroud segment, in accordance with a particular embodiment.

Referring to FIG. 6, in a particular embodiment the wheel body 52 also includes an annular outer body grinding surface 66 opposite the inner body surface 54. In the embodiment shown, the outer body grinding surface 66 extends along the axial direction $A_W$, and is complementary to the outer surfaces 68 of the retention elements legs 34, which both protrude radially from their respective flange 36 to define these aligned outer surfaces 68. Both leg outer surfaces 68 are thus simultaneously ground through contact with the outer body grinding surface 66 while the wheel 50 rotates relative to the shroud segment 20. In a particular embodiment, the shroud segment 20 is retained in a fixed position by engagement with positioning elements prior to grinding the flange inner surfaces 38, and remains engaged in the same fixed position by the positioning elements for simultaneously grinding the leg outer surfaces 68.

Figure 7:
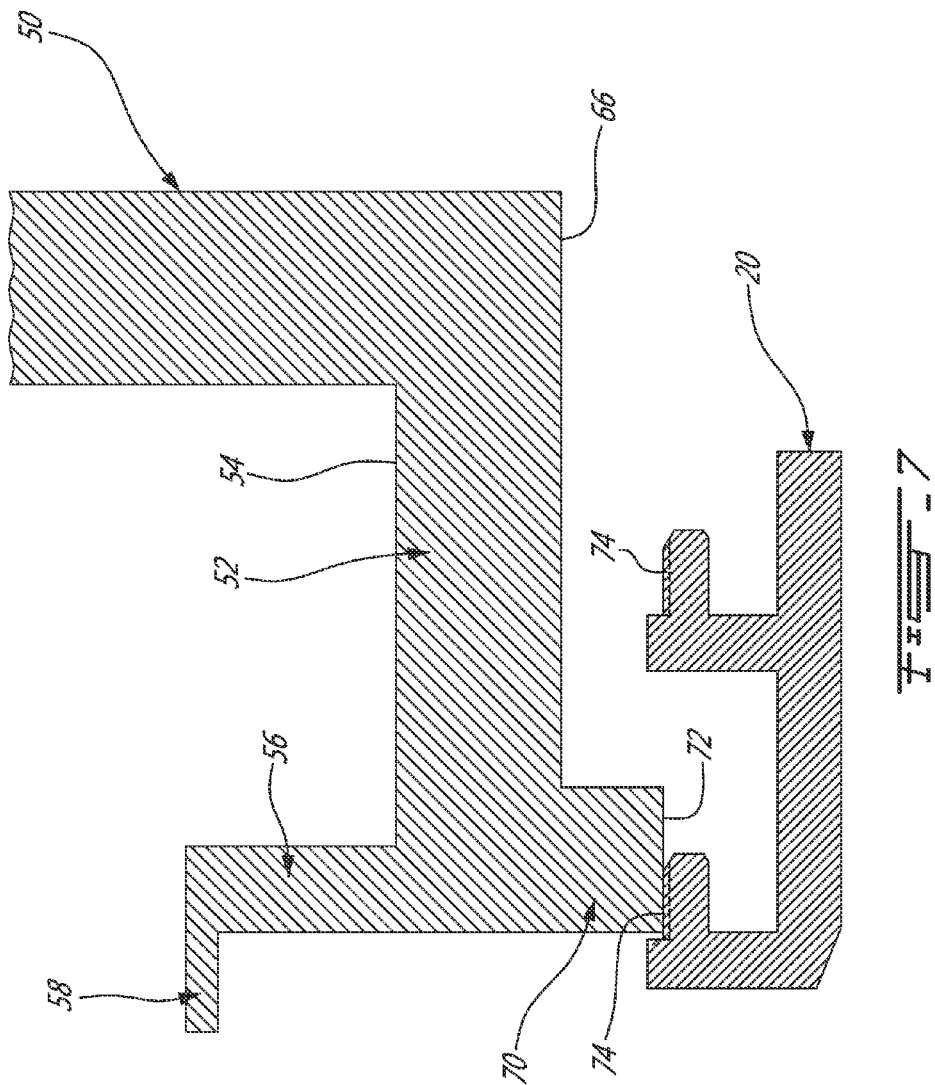
FIG. 7 is a schematic cross-sectional view of the grinding wheel grinding flange outer surfaces of the shroud segment, in accordance with a particular embodiment.

Referring to FIG. 7, in a particular embodiment the wheel body 52 also includes an outer leg 70 protruding radially outwardly of the outer body grinding surface 66, for example in alignment with the leg 56 supporting the wheel flange 58, and defining an additional annular outer grinding surface 72 spaced radially outwardly from the annular outer body grinding surface 66. In the embodiment shown, the additional outer grinding surface 72 extend along the axial direction $A_W$. The additional outer grinding surface 72 are complementary to outer surfaces 74 of the retention elements flanges 36, which are defined opposite the flange inner surfaces 38. Both flange outer surfaces 74 are thus sequentially ground through contact with the additional outer body grinding surface 72 while the wheel 50 rotates relative to the shroud segment 20. In a particular embodiment, the shroud segment 20 remains retained in the fixed position by engagement with the positioning elements through grinding the flange inner surfaces 38, the leg outer surfaces 68 and the flange outer surfaces 74.

Figure 8:
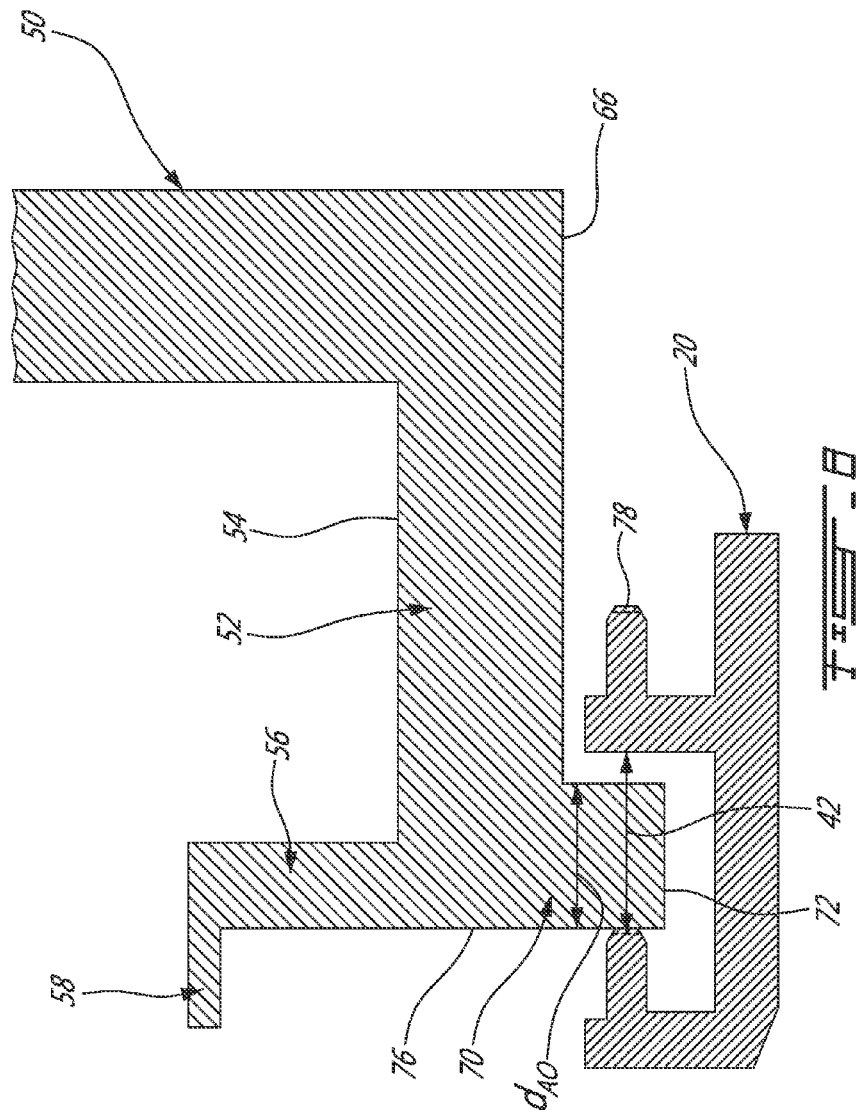
FIG. 8 is a schematic cross-sectional view of the grinding wheel grinding end surfaces of the shroud segment, in accordance with a particular embodiment.

Referring to FIG. 8, in a particular embodiment, the axial dimension $D_{AO}$ of the outer leg 70 is smaller than the smallest axial distance between the retention elements 30a, 30b as defined by the gap 42, and the outer leg 70 also defines a radially extending side grinding surface 76 configured for grinding radially extending end surfaces 78 of the flanges 36 of the retention elements 30a, 30b. Both flange end surfaces 78 are thus sequentially ground through contact with the side grinding surface 76 while the wheel 50 rotates relative to the shroud segment 20. In a particular embodiment, the shroud segment 20 remains retained in the fixed position by engagement with the positioning elements through grinding the flange inner surfaces 38, the leg outer surfaces 68, and the flange outer and end surfaces 74, 78.

Figure 9:
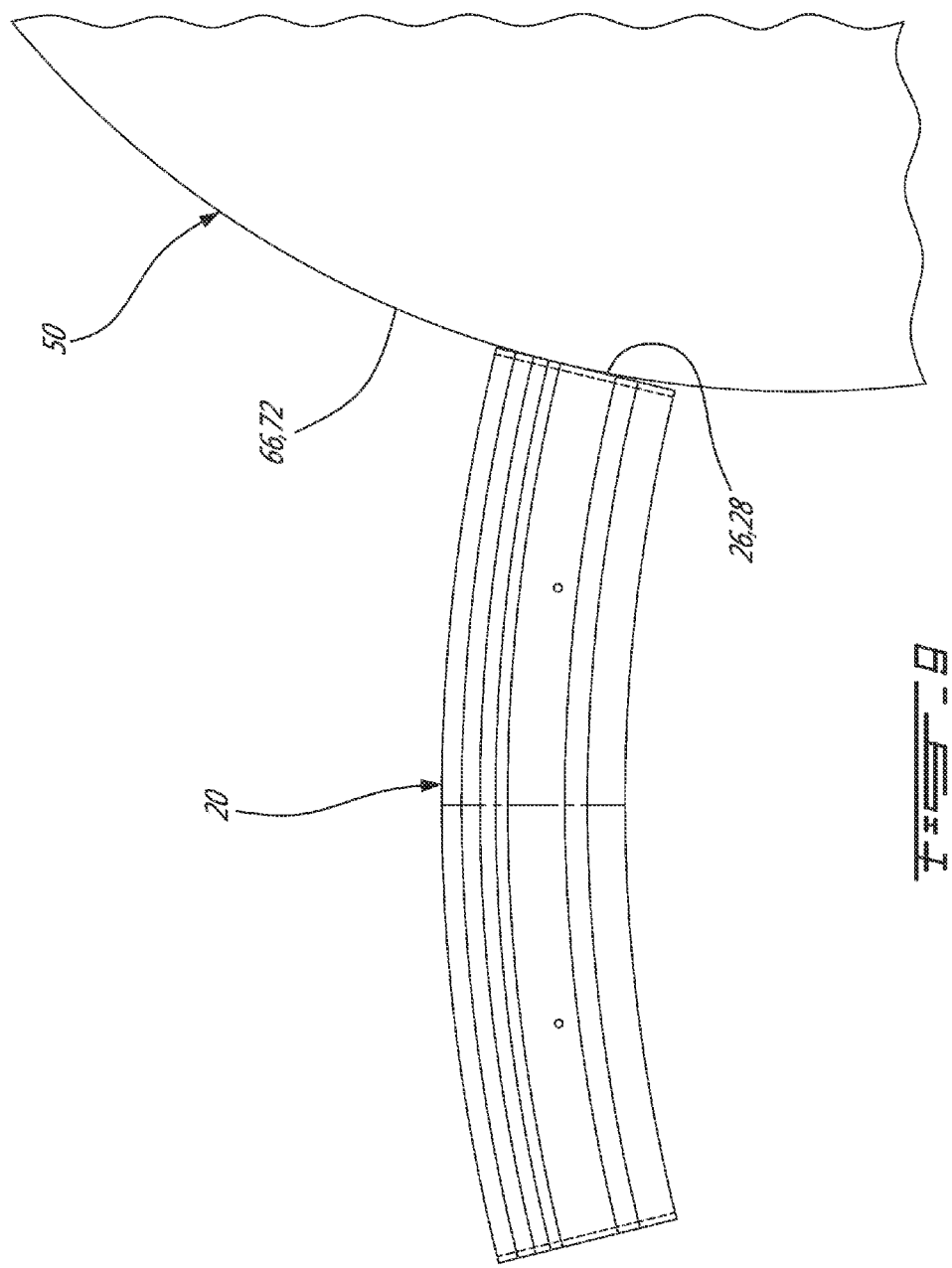
FIG. 9 is a schematic front view of the grinding wheel grinding a side surface of the shroud segment, in accordance with a particular embodiment.

Referring to FIG. 9, in a particular embodiment, one of the outer grinding surfaces 66, 72 is also used to grind the side surfaces 26, 28 of the shroud segment 20. The part of the outer grinding surfaces 66, 72 used to grind the side surfaces 26, 28 may be the same as that used for grinding the leg outer surfaces 68 or the flange outer surfaces 74, or it may be another section of the outer grinding surfaces 66, 72. In a particular embodiment, the shroud segment 20 remains retained in the fixed position by engagement with the positioning elements through grinding the flange inner surfaces 38, the leg outer surfaces 68, the flange outer and end surfaces 74, 78, and the segment side surfaces 26, 28.

It is understood that all grinding surfaces are made of a material sufficiently abrasive with respect to the material of the shroud segment such as to be able to perform a grinding operation. In a particular embodiment, the grinding wheel 50 is a superbrasive wheel with each grinding surface being plated with Cubic Boron Nitride (CBN) grains. Other suitable materials are also possible.

It is understood that alternately, the wheel 50 may not be configured to grind all of the surfaces of the shroud segment 20; any combination of the above mentioned surfaces may be ground by the wheel 50.

Figure 10:
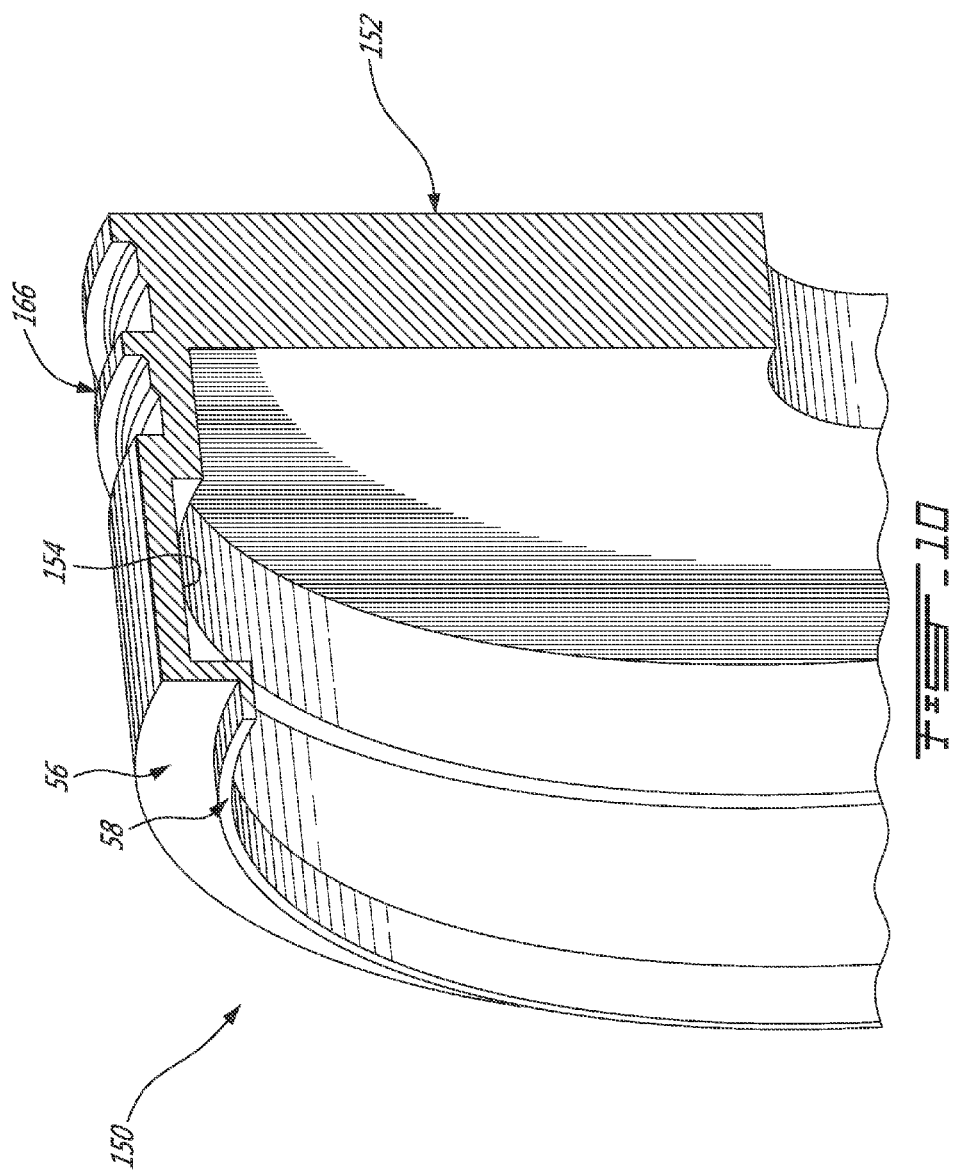
FIG. 10 is a schematic tridimensional cross-sectional view of a grinding wheel according to another particular embodiment, which may be used to grind a shroud segment such as shown in FIG. 2; grinding wheel according to a particular embodiment, which may be used to grind a shroud segment such as shown in FIG. 2.
Figure 11:
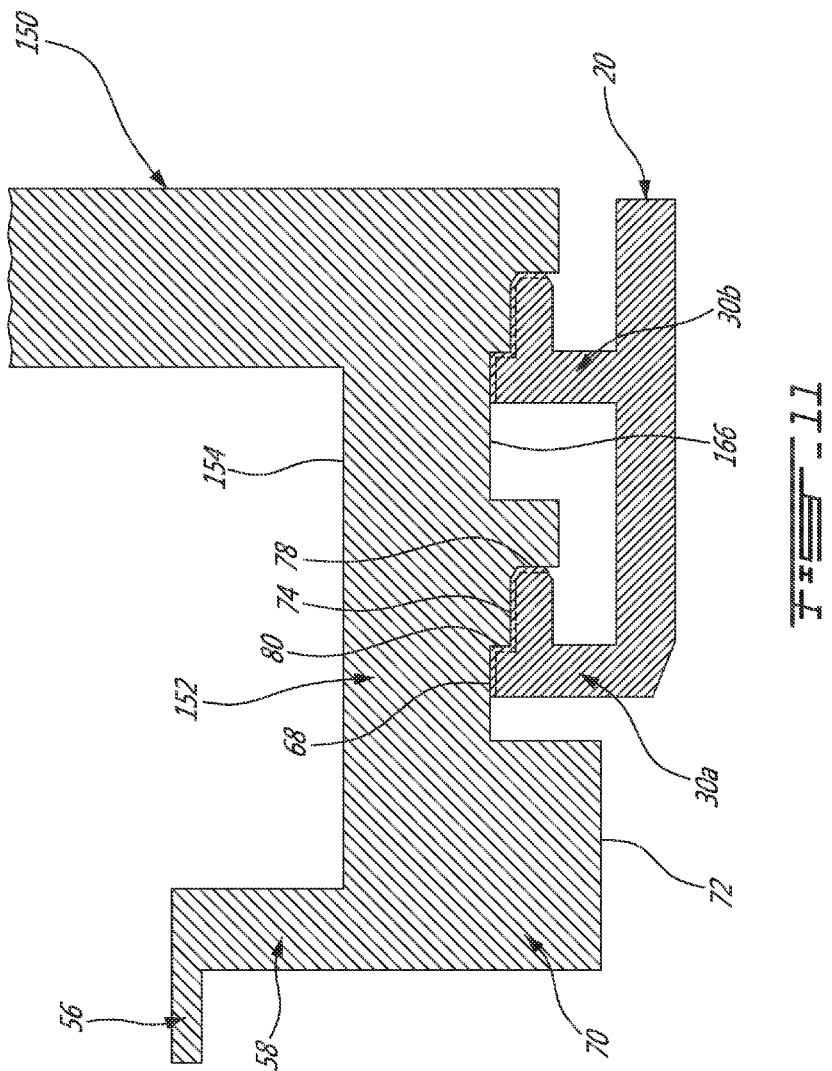
FIG. 11 is a schematic cross-sectional view of the grinding wheel of FIG. 10 grinding surfaces of the shroud segment, in accordance with a particular embodiment.

Referring to FIGS. 10-11, a grinding wheel 150 according to an alternate embodiment is shown. The grinding wheel 150 generally includes a body 152 having an annular inner body surface 154, and includes the annular flange 58 for grinding the flange inner surfaces 38 of the shroud segment 20, which is supported by the annular leg 56 extending radially inwardly from the annular inner body surface 154. The leg 56 and flange 58 are similar to the corresponding elements described above, and accordingly will not be further described herein.

The wheel body 152 includes an annular outer body grinding surface 166. Referring particularly to FIG. 11, the outer body grinding surface 166 has a contoured shape complementary to both flange outer surfaces 74 and to a contour of the retention elements 30a, 30b adjacent each flange outer surface 74, including the leg outer surfaces 68, the flange end surfaces 78, and an intermediate leg surface 80 connecting the leg outer surface 68 to the flange outer surface 74. The two flange outer surfaces 74, leg outer surfaces 68, the flange end surfaces 78 and the intermediate leg surfaces 80 are thus all simultaneously ground through contact with the outer body grinding surface 166 while the wheel 150 rotates relative to the shroud segment 20. In a particular embodiment, this grinding is performed without releasing the shroud segment 20 from the positioning elements retaining it for grinding of the flange inner surfaces 38.

In a particular embodiment, the wheel body also includes an outer leg 70 protruding radially outwardly of the annular outer body grinding surface 166, for example in alignment with the leg 56 supporting the wheel flange 58, and defining an additional annular outer grinding surface 72 spaced radially outwardly from the annular outer body grinding surface 166. In a particular embodiment, the additional annular outer grinding surface 72 is used to grind the side surfaces 26, 28 of the shroud segment 20, for example as shown in FIG. 9.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of machining a turbine shroud segment defining a circumferential portion of an annular shroud, the segment having an arcuate platform and two axially spaced retention elements extending radially outwardly from the platform, the method comprising:
    inserting an annular flange of a grinding wheel through a first gap defined between the retention elements and into a second gap defined between the platform and an axially extending, radially inwardly facing arcuate inner surface of one of the retention elements, the flange being supported by a leg of the grinding wheel, the leg extending radially inwardly from an annular inner surface of a body of the grinding wheel, the flange being inserted with the leg and body remaining out of contact with the shroud segment and with the flange remaining out of contact with the arcuate platform;
    grinding the arcuate inner surface of the one of the retention elements through contact with an annular outer grinding surface of the flange while the wheel rotates relative to the shroud segment, the leg and body remaining out of contact with the shroud segment and the flange remaining out of contact with the platform during grinding of the arcuate inner surface.

2. The method as defined in claim 1, wherein grinding the arcuate inner surface includes grinding the entire arcuate inner surface while contacting at most 30% of the arcuate inner surface with the outer grinding surface at any time.

3. The method as defined in claim 1, wherein the arcuate inner surface has a radius greater than that of the outer grinding surface.

4. The method as defined in claim 3, wherein the radius of the outer grinding surface is at most 98% the radius of the arcuate inner surface.

5. The method as defined in claim 1, wherein a radial thickness of the flange is at most 80% of a radial dimension of the second gap.

6. The method as defined in claim 5, wherein the radial thickness of the flange is at least 0.050 inches.

7. The method as defined in claim 1, wherein the method further comprises, after or before grinding the arcuate inner surface, grinding simultaneously at least two outer surfaces of the retention elements with the wheel.

8. The method as defined in claim 7, wherein:
    the other one of the retention elements also includes an axially extending, radially inwardly facing arcuate inner surface spaced apart from the platform, each of the retention elements including an axially extending, radially outwardly facing arcuate outer surface opposite the arcuate inner surface thereof, the wheel body including a body grinding surface complementary to the arcuate outer surfaces and to a contour of the retention elements adjacent the arcuate outer surfaces; and
    grinding simultaneously the at least two outer surfaces includes simultaneously grinding the arcuate outer surfaces and a contour of the retention elements adjacent the arcuate outer surfaces through contact with the body grinding surface while the wheel rotates relative to the shroud segment.

9. The method as defined in claim 8, wherein the shroud segment is retained in a fixed position prior to grinding the arcuate inner surface, the shroud segment remaining engaged in the same fixed position for grinding simultaneously the at least two outer surfaces and for grinding the arcuate inner surface of the one of the retention elements.

10. The method as defined in claim 9, wherein the shroud segment defines the circumferential portion of the shroud between two radially extending side surfaces, the method further comprising grinding each of the side surfaces with the shroud segment remaining engaged in the same fixed position for grinding simultaneously the at least two outer surfaces, the arcuate inner surface of the one of the retention elements, and for grinding the side surfaces.

11. A method of producing a turbine shroud segment defining a circumferential portion of an annular shroud, the method comprising:
    manufacturing the shroud segment to define:
        an arcuate platform extending along the circumferential portion, and
        first and second axially spaced apart retention element extending radially outwardly from the platform, the first retention element having a leg extending radially outwardly from the platform and an arcuate flange extending axially from the leg toward the second retention element, the flange being axially spaced apart from the second retention element, the flange having an arcuate flange inner surface spaced apart from and facing the platform;
    providing a grinding wheel having:
        a body defining an annular inner body surface,
        an annular wheel leg extending radially inwardly from the inner body surface along a radial distance greater than a maximum radial dimension of the retention elements as defined from the platform, and
        an annular wheel flange extending axially from the wheel leg away from the body and having an annular outer grinding surface, a total axial dimension of the wheel leg and wheel flange being smaller than a smallest axial distance between the second retention element and the flange of the first retention element, a radial thickness of the wheel flange being smaller than a radial distance between the flange inner surface of the first retention element and the platform;

inserting the wheel flange between the second retention element and the flange of the first retention element and into the space between the flange inner surface of the first retention element and the platform; and grinding the flange inner surface through contact with the outer grinding surface while the wheel rotates relative to the shroud segment.

12. The method as defined in claim 11, wherein the flange inner surface is ground with at most 30% of the flange inner surface being in contact with the outer grinding surface at the same time throughout grinding of the entire flange inner surface.

13. The method as defined in claim 11, wherein the flange inner surface has a radius greater than that of the outer grinding surface.

14. The method as defined in claim 11, wherein the radial thickness of the wheel flange is at least 0.050 inches and at most 80% of the radial distance between the flange inner surface of the first retention element and the platform.

15. The method as defined in claim 11, wherein the leg of the first retention element is a first leg and the flange of the first retention element is a first flange, and wherein:

the shroud segment is manufactured with the second retention element having a second leg extending radially outwardly from the platform and having an arcuate second flange extending axially from the second leg away from the first retention element, each of the first and second flanges having an arcuate outer flange surface facing away from the platform;

the wheel is provided with a body grinding surface complementary to the arcuate flange outer surfaces and to a contour of the retention elements adjacent the flange outer surfaces; and the method further includes grinding simultaneously the arcuate flange outer surfaces and the contour of the retention elements adjacent the flange outer surfaces through contact with the body grinding surface while the wheel rotates relative to the shroud segment.

16. The method as defined in claim 15, wherein the shroud segment is retained in a fixed position prior to grinding the flange inner surface, the shroud segment remaining engaged in the fixed position for grinding simultaneously the arcuate flange outer surfaces and the contour of the retention elements.

17. The method as defined in claim 16, wherein the shroud segment defines the circumferential portion of the shroud between two radially extending side surfaces, the method further comprising grinding each of the side surfaces with the wheel, the shroud segment remaining engaged in the same fixed position for grinding simultaneously the at least two outer surfaces, the arcuate inner surface of the one of the retention elements, and the side surfaces.

18. The method as defined in claim 11, wherein manufacturing the shroud segment is performed using a metal injection molding process.

* * * * *